United States Patent Office 3,333,344
Patented Aug. 1, 1967

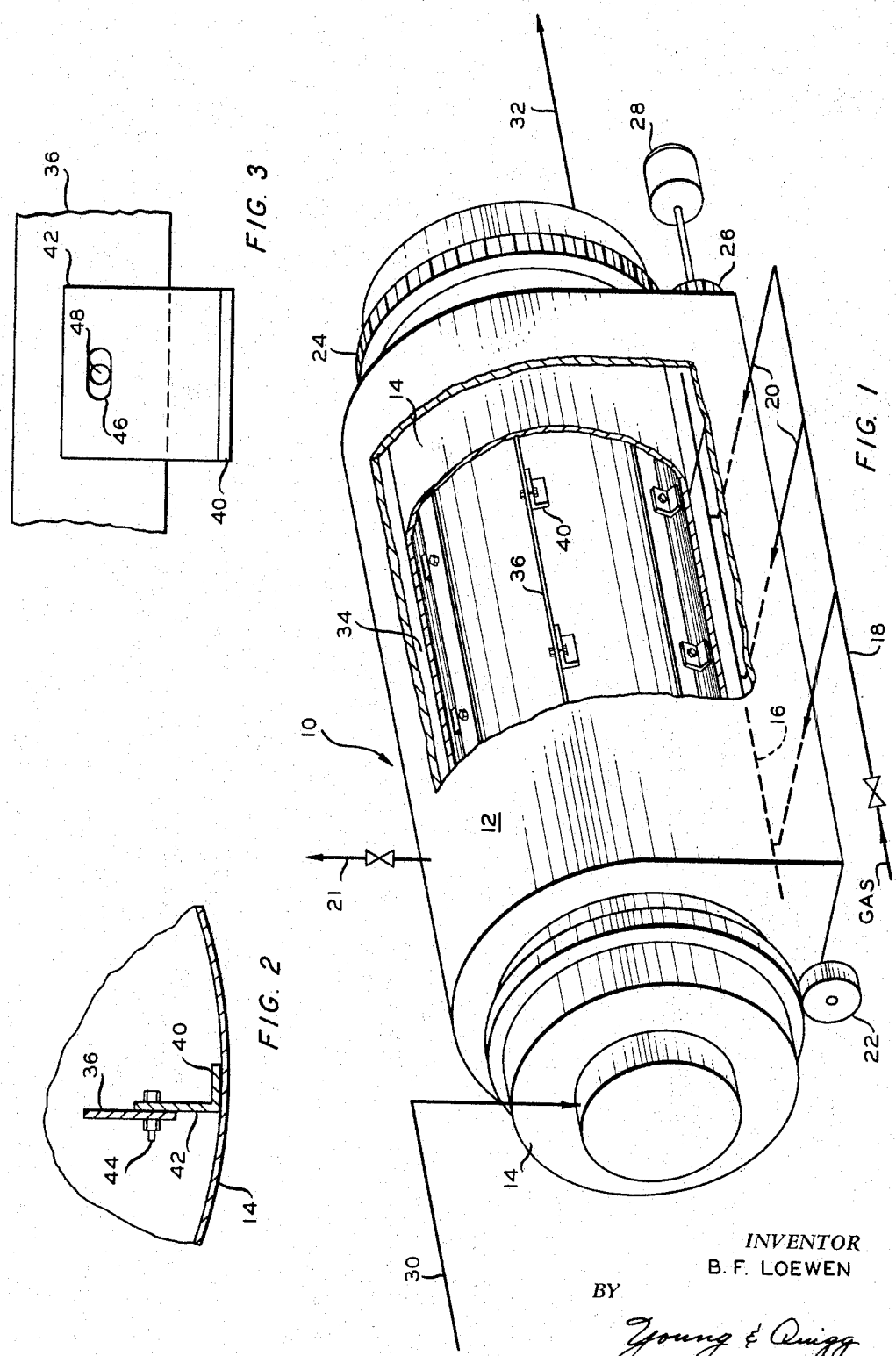

3,333,344
ROTARY DRYER
Bruno F. Loewen, Borger, Tex., assignor to Phillips Petroleum Company, a corporation of Delaware
Filed Nov. 22, 1965, Ser. No. 509,110
7 Claims. (Cl. 34—31)

This invention relates to an improved rotary dryer structure for drying particulate porous solids containing water or other readily vaporizable liquid in an improved manner and the improved process of drying the particulate solids.

The carbon black industry is a huge industry producing many millions of pounds of carbon black each year. Most of the commercial carbon black is produced in the form of flocculent powder from selected oil stocks by partial combustion at high temperatures. The resulting black is collected in bag filters and fed to wet pellet mills where the powdered black is mixed with an approximately equal weight of water while being stirred with mill rods attached to the axis of the mill, the mill shell being rotated. The wet pellets are fed from the pellet mill into a rotary dryer, the shell of which is generally heated by an enclosing furnace fire box. In some plants, hot gas is also passed thru the interior of the dryer to aid in the drying operation by purging the dryer of moisture. A typical plant operation produces relatively hard dry pellets having approximately 0.5 weight percent moisture, the pellets being of a size of about $\frac{1}{32}$ to $\frac{1}{8}''$ in diameter. The pelleting operation has as its objective the densification of the black and freeing the black of dust or powder to facilitate the shipping and handling thereof while avoiding the extremely dirty conditions which are attendant upon the transportation of black in powdered form.

Until recently, wet pelleting of carbon black was a particularly troublesome process which resulted in inefficient operation with frequent shut-downs and frequent recycling of poorly pelleted or unpelleted black to the pellet mill. These difficulties were caused by the inability of the workers in the art to devise a technique for reasonably accurately proportioning the flow of water and loose black to the pellet mills. However, a recent improvement has been made in the control of the flow rates of water and carbon black to a pellet mill so as to vastly improve the pelleting process. This technique of operation or method of control is disclosed in the copending application of Carl E. Alleman, Ser. No. 269,248, filed Apr. 1, 1964, now U.S. Patent 3,266,873, Aug. 16, 1966, directed to carbon black pelleting. As a result of this improvement in pelleting, a much higher daily flow rate of pellets from the pellet mills has occurred. In fact, the average daily production of the pellet mills in the plants in which the aforesaid invention has been installed has approximately doubled. In view of the fact that the dryers operating downstream of the pellet mills were not originally designed for the higher capacity now required, these pellet dryers became a serious bottleneck in plant operation.

This invention is concerned with a revised or improved dryer structure which substantially improves drying efficiency and materially increases the capacity of the dryer.

Accordingly, it is an object of the invention to provide an improved rotary dryer construction for use in drying particulate porous solids containing moisture. Another object is to provide an improved method of drying moist porous particulate solids such as carbon black. Other objects of the invention will become apparent to one skilled in the art upon consideration of the accompanying disclosure.

A broad aspect of the invention apparatus-wise as applied to a rotary dryer in the form of a horizontally elongated cylindrical drum rotating with its axis horizontal within a surrounding fire box of a furnace or other heating means, comprises a series of lifting vanes extending along the inside of the drum generally parallel with the drum axis and uniformly circumferentially spaced from the drum, their width extending radially or on a normal relative to the drum and spaced a small distance therefrom to allow flow of solids between the vanes and the drum during rotation of the drum in the drying operation. In other words, the vanes stand on edge extending radially from the drum wall and are attached thereto by spaced-apart support means at regular intervals, being positioned on the support means a distance preferably in the range of about $\frac{3}{4}$ to $1\frac{1}{4}''$. The vanes extend from near the downstream end of the drum (outlet end) forwardly a distance in the range of about $\frac{1}{8}$ to $\frac{1}{2}$ the length of the drum. Other details of the construction are described in reference to the drawing.

Process-wise, the invention comprises feeding wet particulate porous solids into a rotating drum and simultaneously heating the outside of the drum by any means so as to tumble the pellets from the upwardly moving wall of said drum, in a downstream section of said drum to which heat is being applied mechanically lifting a substantial portion of said solids up the upwardly moving wall of said drum substantially farther than in the forward end of the drum and passing the lifted solids along and in contact with the heated wall of the drum in said section so as to substantially completely dry the said solids, and recovering the dried solids downstream of the lifting section. The vanes in the drum move a substantial portion of the solids within the section in which the vanes are positioned, upwardly along the hot drum wall and release them at the drum wall so that the solids flow along and contact the hot drum wall above the main mass of pellets therebelow. Thus, longer contact time with the hot drum is provided by the lifting step (effected by the vanes) and considerably faster drying with the attendant increase in thruput or capacity is attained.

A more complete understanding of the invention may be had by reference to the accompanying schematic drawing of which FIGURE 1 is a pictorial view in partial section of a preferred form of rotary dryer illustrating the invention; FIGURE 2 is a fragmentary transverse section of a dryer drum illustrating the vane structure and location; and FIGURE 3 is a fragmentary plan view of a vane and supporting structure therefor.

Referring to FIGURE 1, dryer 10 comprises a furnace 12, the fire box of which surrounds dryer drum 14 and is provided with a series of burner means 16 supplied with fuel gas from line 18 thru individual burner lines 20. Effluent heating gas is vented thru stack 21. Drum 14 is supported on two pairs of rollers 22, one pair being positioned at each end of the drum. A drive ring 24 attached to the downstream end of drum 14 engages a driving gear 26 operated by an electric motor 28. A particulate solids feed line 30 communicates with the upstream end of drum 14 for the purpose of introducing particulate wet solids thereto and product pellet line 32 communicates with the downstream end of drum 14 for withdrawing dried solids.

A cut-away section 34 of dryer 10 exposes a downstream section of drum 14 which is also cut away to show the arrangement of vanes 36 in drum 14.

FIGURES 2 and 3 show in some detail the specific means of positioning and attaching the vanes to the interior of drum 14. Angle iron clips 40 are welded to the interior wall of drum 14 to leave an inwardly and normally projecting (radially) arm 42 to which vane 36 is attached by means of bolt and nut arrangement 44.

FIGURE 3 illustrates the arrangement of a slotted hole 46 in arm 42 of clip 40 and matching circular hole 48 in vane 36. The slotted hole 46 allows limited movement of the vane longitudinally within the shell to compensate for unequal expansion and contraction when heating and cooling the dryer. A number of clips 40 are welded to the inner wall of the drum at regular intervals from end to end of the vanes 36.

In the application of the invention to rotary dryers in 9 different installations in carbon black plants, dryer drum 14 is 80′ long and 7′ in diameter with the fire box of furnace 12 enclosing 60′ of the dryer, leaving about 10′ on each of the upstream and downstream ends of the dryer drum extending from the furnace. Vanes 36 are carbon steel ¼″ thick, 4″ wide, and 16′ long, beginning at the approximate plane of the downstream end of furnace 12 and extending upstream thereof so that substantially all of the lifting section of the drum is heated by the fire box of the furnace. Clips 40 were constructed of ⅜″ thick carbon steel with 4″ wide and 4″ long arms. The holes in the clips and the vanes were positioned so as to lock the vanes 36 with the near edge 1″ from the dryer wall. Six clips uniformly spaced longitudinally of the drum support each vane, the end clips being spaced 6″ from the ends of the vane.

A series of 7 of these 16′ long vanes were installed in each drum as described.

The modification of the dryers in accordance with the invention has eliminated the dryers as a capacity bottleneck. The amount of fuel required has been substantially reduced and the ability to control product temperature has been greatly improved.

While the specific structure and sizes of the installation described may be varied substantially within the scope of the invention, the essential requirement is the positioning of the vanes in the downstream end of the dryer within the drum area being heated and extending only a portion of the distance toward the upstream end of the dryer. The vanes must be spaced from the wall of the dryer so as to allow solids being dried to contact the hot drum as they pass between the vanes and the wall of the drum during the lifting phase of the drying. It is essential that a substantial section of the upstream end of the drum be free of vanes and have a smooth inner surface to avoid rough handling of the carbon black pellets (when this is the material being dried) due to the softer and weaker condition of the moist pellets as they come from the pellet mill.

The improved dryer drum is particularly applicable to the drying of wet carbon black pellets containing about 40 to 60 weight percent of water, but it is also useful in drying other porous particulate materials such as pelleted catalysts.

A typical flow in a carbon black pelleting plant is illustrated in Marsh U.S. Patent 3,017,662. However, the controls on the flow of water and black to the pelleting mills as now practiced and as shown in the above identified copending application is not illustrated in the Marsh patent.

Certain modifications of the invention will become apparent to those skilled in the art and the illustrative details disclosed are not to be construed as imposing unnecessary limitations on the invention.

I claim:
1. A rotary dryer for drying particulate porous solids comprising in combination:
   (1) a horizontally elongated cylindrical dryer drum rotatable with its axis substantially horizontal having means at one end for introducing said solids containing moisture and means at the opposite end for withdrawing dried solids;
   (2) means adjacent the exterior of said drum for heating the wall of said drum;
   (3) a series of uniformly circumferentially-spaced lifting vanes extending longitudinally generally parallel with the axis of said drum from adjacent the downstream end thereof forwardly a distance in the range of about ⅛ to ⅔ the length thereof, supported from the inner wall of said drum substantially normal thereto and spaced a distance therefrom in the range of ¾ to 1¼ inches to allow said solids to flow between said vanes and said inner wall in contact therewith during rotation of said drum; and
   (4) means for rotating said drum.
2. The dryer of claim 1 wherein said vanes are supported from said inner wall by angle iron clips at regular intervals along said vanes.
3. The dryer of claim 2 wherein said clips are provided with slotted holes extending longitudinally of said vanes, said vanes contain matching holes, said vanes are attached to said clips by bolts, and said clips are welded to said inner wall.
4. The dryer of claim 1 wherein said drum has a length in the range of about 30 to 60 feet and said vanes extend from adjacent the downstream end forwardly at least one-third of the length of said drum.
5. A process for drying porous particulate solids a diameter in the range of about 1/32 to ⅛ inch containing a substantial concentration of water which comprises the steps of:
   (1) passing said solids longitudinally thru a horizontally rotating and elongated cylindrical dryer drum;
   (2) heating the cylindrical wall of said drum to a temperature in the range of about 300 to 450° F;
   (3) in the downstream half of said drum, mechanically elevating said solids along the upwardly moving wall of said drum above the normal level of pellets therein and releasing substantially all of the elevated solids on said wall at the end of the lifting step so that said solids fall along said wall to a mass of pellets in the lowermost section of said drum; and
   (4) recovering dried solids from the downstream end of said drum.
6. The process of claim 5 wherein said solids are wet carbon black pellets.
7. A rotary dryer for drying particulate porous solids comprising in combination:
   (1) a horizontally elongated cylindrical dryer drum rotatable with its axis substantially horizontal having means at one end for introducing said solids containing moisture and means at the opposite end for withdrawing dried solids;
   (2) means adjacent the exterior of said drum for heating the wall of said drum;
   (3) a series of uniformly circumferentially-spaced lifting vanes extending generally parallel with the axis of said drum from adjacent the downstream end thereof forwardly a distance in the range of about ⅛ to ⅔ the length thereof, supported from the inner wall of said drum substantially normal thereto and spaced a distance therefrom to allow said solids to flow between said vanes and said inner wall in contact therewith during rotation of said drum, said vanes being substantially rectangular plates and extending edgewise substantially radially inwardly; and
   (4) means for rotating said drum.

References Cited
UNITED STATES PATENTS
| | | | |
|---|---|---|---|
| 2,959,869 | 11/1960 | Ackerman | 259—81 X |
| 3,013,785 | 12/1961 | King | 34—135 X |
| 3,258,253 | 6/1966 | Brown | 259—81 |

KENNETH W. SPRAGUE, *Primary Examiner.*